United States Patent [19]

Steinberg

[11] Patent Number: 4,555,392

[45] Date of Patent: Nov. 26, 1985

[54] PORTLAND CEMENT FOR SO₂ CONTROL IN COAL-FIRED POWER PLANTS

[75] Inventor: Meyer Steinberg, Melville, N.Y.

[73] Assignee: The United States of America as represented by the United States Department of Energy, Washington, D.C.

[21] Appl. No.: 661,842

[22] Filed: Oct. 17, 1984

[51] Int. Cl.⁴ .................. B01J 8/00; C01B 17/00; F23B 7/00; F23J 11/00

[52] U.S. Cl. .................. 423/244; 110/343; 110/345

[58] Field of Search .......... 423/242 A, 242 R, 244 A, 423/244 R; 110/343, 345

[56] References Cited

U.S. PATENT DOCUMENTS

| | | | |
|---|---|---|---|
| Re. 31,236 | 5/1983 | Saitoh et al. | 423/243 |
| 3,481,289 | 12/1969 | Oda et al. | 110/345 |
| 4,049,462 | 9/1977 | Cocozza | 106/85 |
| 4,070,300 | 1/1978 | Moroni et al. | 252/190 |
| 4,091,076 | 5/1978 | Vogel et al. | 423/244 |
| 4,136,998 | 1/1979 | Bassier et al. | 405/267 |
| 4,140,181 | 2/1979 | Ridley et al. | 166/259 |
| 4,140,750 | 2/1979 | Oschell | 423/242 |
| 4,314,980 | 2/1982 | Shen et al. | 423/331 |
| 4,388,877 | 6/1983 | Molayem et al. | 110/343 |

OTHER PUBLICATIONS

Yoo et al, Regenerable Agglomerated Cement for Sulfur Removal in Circulating Fluidized-Bed Combustion Systems, Brookhaven National Lab., Feb. 1983.

*Primary Examiner*—Gregory A. Heller
*Attorney, Agent, or Firm*—Margaret C. Bogosian; James W. Weinberger; Judson R. Hightower

[57] ABSTRACT

There is described a method of removing oxides of sulfur from the emissions of fossil fuel combustion by injecting portland cement into the boiler with the fuel, the combustion air, or downstream with the combustion gases. There is also described the cement products that result from this method.

5 Claims, No Drawings

PORTLAND CEMENT FOR SO$_2$ CONTROL IN COAL-FIRED POWER PLANTS

The U.S. Government has rights in this invention pursuant to Contract Number DE-AC02-76CH00016, between the U.S. Department of Energy and Associated Universities Inc.

BACKGROUND OF THE INVENTION

Because of potential danger to the environment, particularly resulting from acid rain, much attention has recently been devoted to the control of emissions from fossil fuel combustion. Attention has been directed especially to systems which permit retrofitting of existing installations to avoid the capital investment required to construct new facilities.

While a number of techniques have attracted attention, principal interest has focused on the direct injection of dry sorbent into the boiler and collection and disposal of the spent sorbent and fly ash on a once through basis. The sorbent which has heretofore proven most attractive is limestone or calcium carbonate. It may be injected either with the fuel, with the combustion air, or downstream in the combustion gases. Injection equipment is well known and conventional. The sorbent reacts with the sulfur dioxide to form a sulfated sorbent which is separated in the electrostatic precipitation equipment normally available in power plants. The increase in the mass of solids to be separated by the precipitation or other separating means is not unreasonable, provided an active sorbent is used. It has been reported by the Environmental Protection Agency, that limestone injection multistage burner technology is capable of cutting the marginal costs of sulfur dioxide emissions by one-half to two-thirds, or even more in those boilers that could be retrofit in accordance with the technology. The two other alternatives; namely head end coal desulfurization, or back end flue gas desulfurization, require substantial new capital expenditures and their installation would require substantial shut down times of the boiler.

The requirements of an acceptable sorbent are that it is (1) widely available, (2) low in cost, and (3) has a high capacity for neutralizing sulfur dioxide either by direct reaction, or by sorption. Limestone meets these qualifications quite well, but is not completely satisfactory for a number of reasons. One disadvantage of limestone is its lack of uniformity. Another disadvantage of using limestone as a sorbent is that calcined limestone normally has no more than about 50 percent capacity for conversion of sulfur dioxide to calcium sulfate. Furthermore, the reactivity and capacity of limestone pellets for sulfur dioxide is drastically reduced above 850° C. (1562° F.) because the pore structure of the calcined limestone is adversely affected at this temperature. As a result, the calcined limestone particles usually allow only shell loading of sulfur dioxide, and the central core of the pellets is unavailable for reaction.

A further disadvantage is that the calcium oxide content and uniformity of limestone is not satisfactory. The theoretical content of calcium oxide in limestone or calcium carbonate is 56 percent. Even high grade natural limestone (Calcite, Greer limestone, Vicron), because of other impurities, contains only about 80 percent calcium carbonate, thus, the active calcium oxide content is only about 45 percent. Moreover, the reactivity of natural limestone may vary from one quarry to another at various locations throughout the country. It is not economical to distribute the best grade of limestone from one quarry to utility plants at remote locations.

Natural limestone contains a relatively high percentage of impurities, including for example, $Fe_2O_3$, $SiO_2$, $Al_2O_3$, and $MgO$. The reaction of these materials as well as the CaO with coal ash is probably a major cause for the reduction of the capacity of limestone to neutralize the sulfur dioxide.

THE INVENTION

It has now been found that portland cement is an excellent sorbent for sulfur dioxide by the direct injection method. The cement, like limestone, can be injected into the boiler with the fuel, the combustion air, or downstream in the combustion gases. In any event, it reacts with the sulfur dioxide formed from the fossil fuel being combusted to form calcium sulfite silicate. In the presence of sufficient oxygen, it will form calcium sulfate silicate. Both of these products can be removed easily and efficiently with the fly ash using existing collection equipment. The process of the invention, therefore, is readily adaptable to retrofit engineering. The exhaust product of the treatment is a mixture of sulfated cement, unreacted cement and flyash. It can be separated and the appropriate chemicals recycled, or it can be used directly as a relatively low grade cement.

The advantages of portland cement are that (1) it has high reactivity and capacity for sulfur dioxide at high temperatures, (2) it is manufactured under good quality control conditions, (3) it is less susceptible to reduced activity due to interaction with mineral matter in fly ash, or in coal, and other fossil fuels, (4) it does not reduce the efficiency of the power plant, and (5) it is widely available. A disadvantage is that it is more costly than limestone. However, its advantages could neutralize this problem.

Portland cement, the common name for calcium silicate cement, consists principally of di- and tri- calcium silicates, $(CaO)_2SiO_2$, and $(CaO)_3SiO_2$. It is manufactured by firing limestone with sand in a kiln at temperatures of the order of up to 1500° C. (2732° F.). The product of this treatment is called the clinker. It is then crushed and ground to form the cement product. Thus, the limestone is calcined and the lime is chemically bound with silica so that it cannot be affected by such impurities as iron oxide and aluminum oxide that may be present in fly ash and mineral matter during the coal combustion. It may be mixed with small amounts of gypsum which is normally present in commercial cements, and the resulting product is useful in the practice of this invention. The principal reactants, however, are the mono-, di- and tri-silicates shown in the following table. The term portland cement as used in this specification and the claims that follow refers to the reaction product of limestone and sand whether or not mixed with gypsum or other additives.

The following table shows typical chemical compositions of several samples of some American portland cements. All of these are useful in the practice of this invention, but portland cement type III is preferred since it consistently has the highest CaO content.

Composition of Some of American Portland Cements

| ASTM Type | CaO | MgO | Al₂O₃ | Fe₂O₃ | SiO₂ | TiO₂ | Na₂O | K₂O | SO₃ | Free CaO | C₄AF | C₃A | C₃S | C₂S |
|---|---|---|---|---|---|---|---|---|---|---|---|---|---|---|
| I | 63.8 | 3.7 | 5.6 | 2.4 | 20.7 | 0.23 | 0.21 | 0.51 | 1.6 | 0.4 | 7 | 1 | 55 | 18 |
|   | 63.1 | 2.5 | 4.7 | 3.0 | 22.1 | 0.21 | 0.06 | 1.30 | 1.7 | 0.2 | 9 | 7 | 42 | 28 |
|   | 65.8 | 1.1 | 4.7 | 2.1 | 22.2 | 0.30 | 0.40 | 0.19 | 1.6 | 1.6 | 6 | 9 | 54 | 23 |
|   | 62.8 | 1.7 | 6.7 | 2.5 | 21.1 | 0.39 | 0.95 | 0.51 | 1.8 | 2.0 | 8 | 14 | 33 | 35 |
| II | 61.4 | 3.1 | 4.8 | 4.8 | 20.8 | 0.21 | 0.06 | 1.30 | 1.8 | 0.9 | 15 | 5 | 44 | 26 |
|   | 64.9 | 1.9 | 4.0 | 2.1 | 24.0 | 0.23 | 0.23 | 0.55 | 1.7 | 1.5 | 6 | 7 | 41 | 38 |
| III | 65.6 | 1.4 | 5.2 | 2.5 | 20.0 | 0.27 | 0.21 | 0.44 | 2.3 | 1.8 | 8 | 19 | 63 | 10 |
|   | 63.3 | 4.3 | 5.1 | 2.0 | 20.3 | 0.21 | 0.19 | 0.28 | 2.5 | 1.9 | 6 | 10 | 51 | 19 |
| IIV | 59.6 | 3.0 | 4.6 | 5.0 | 22.9 | 0.23 | 0.06 | 1.19 | 1.3 | 0.4 | 15 | 4 | 25 | 47 |
|   | 63.6 | 1.1 | 3.7 | 3.1 | 25.2 | 0.19 | 0.33 | 0.01 | 1.9 | 0.4 | 9 | 5 | 31 | 49 |
| V | 64.3 | 1.7 | 3.1 | 3.3 | 24.4 | 0.19 | 0.08 | 0.22 | 1.4 | 0.5 | 10 | 3 | 45 | 36 |
|   | 62.4 | 2.5 | 1.9 | 1.3 | 26.1 | 0.12 | 0.10 | 0.15 | 2.0 | 1.8 | 4 | 3 | 35 | 48 |
|   | 63.3* | 1.2 | 3.3 | 4.7 | 23.1 |  | 0.08 | 0.37 | 1.7 |  | 14 | 1 | 49 | 30 |

*Corrected for free CaO
$C_4AF = (CaO)_4 \cdot Al_2O_3 \cdot Fe_2O_3$
$C_3A = (CaO)_3 \cdot Al_2O_3$
$C_3S = (CaO)_3 \cdot SiO_2$
$C_2S = (CaO)_2 \cdot SiO_2$ The process of this invention is applicable to any of the normally employed fossil fuels where high sulfur content is a problem. This includes various types of fuel oils, soft bituminous and hard anthracite coals, coal-oil mixtures (COM), coal-oil water mixtures (COW), and coal-water mixtures (CWM). The cement may be employed in any of a variety of mesh sizes and it may be mixed with the fuel or it may be mixed with the combustion air. In either case it is injected through the burner nozzle. Alternatively, it may be injected into the combustion gases downstream of the burner nozzle. The reaction product produced by reacting portland cement with the combustion product of fossil fuels containing sulfur is substantially the same no matter where the cement enters the system.

As stated above, the capacity of limestone for sulfur dioxide is drastically reduced above 850° C. (1562° F.). In contrast, portland cement retains its activity at temperatures as high as 1250° C. (2282° F.).

The mesh size of the cement particles employed in the practice of the invention is not a critical factor so long as the particles can move through the injection equipment. Generally speaking, small particles are preferred since they present the greatest surface area per unit mass. Small particles, however, are more expensive to produce. Therefore, the selection of particle size becomes a balance between efficiency and cost of production. Many portland cements are produced in particle sizes of 20–30 microns (325 mesh), and these particles would normally be most efficient. Coal particles of 50–150 microns (250–100 mesh) are employed in many industrial and other boilers. Therefore, the particle size of the portland cement may range up to 150 microns and even higher. Normally the particle size range will vary from 20–150 microns, although, larger and smaller particles may also be employed.

The active component of limestone for reactivity with sulfur dioxide is the calcium oxide component, not the calcium carbonate which is the major component. Using limestone directly in the boiler means that the thermal energy required to decompose or calcine the limestone must be provided by the power plant fuel, thus decreasing the efficiency of the boiler. For limestone injection into a boiler using 3 percent sulfur coal and a Ca/S feed ratio of 2 with a 50 percent reduction (25 percent sulfation of CaO), the reduction in coal efficiency or heat rate to the power plant due to the endothermic calcination reaction may be as high as 1.5 percent. Some of this will be recovered in the exothermic sulfation reaction, but there would still be a loss of about 1 percent in the power plant which is not insignificant in a high power output plant. In contrast, the plant efficiency with portland cement is higher because this calcining reaction is not necessary. The only reaction is sulfation.

Portland cement is widely available at dispersed locations around the country, within close shipping distance of most power plants.

The amount of portland cement to be injected into the system will, of course, depend upon the amount of sulfur in the coal. Normally, based on the weight of the fuel, the amount of cement will be from about 2.8 to 5.6 times the amount of sulfur in the fuel by weight. Thus, for a coal containing 2 to 5 percent by weight sulfur, the weight of cement made available for reaction will typically vary from 5.6 to 27.8 percent by weight based on the weight of the coal.

What has been described is a method for reducing sulfur dioxide emissions from the burning of fossil fuels be reacting the sulfur dioxide with portland cement before the exhaust gas from the burner exits the boiler system and the novel, useful product produced thereby.

The following non-limiting example is given by way of illustration only.

EXAMPLE

A Kentucky bituminous coal with a carbon content of 70%, a sulfur content of 3% and a mineral matter content of 10%, all by weight, based on the total weight, is combusted in a burner with excess air. The coal is mixed with 16.7% by weight, based on the total weight, of type III portland cement prior to entering the burner. The particle size of the cement is 30–40 microns, and that of the coal 50 to 150 microns. Upon combustion, the calcium silicate combines with the organic and inorganic sulfur in the coal to form calcium sulfate silicate. Under these conditions, 50% of the cement is utilized to capture the sulfur. This is mixed with the fly ash that is caught either in bag filters or electrostatic precipitators. Over 95% of the sulfur oxides is removed by the cement. The collected solid product contains about 38% fly ash, 31% sulfated cement and 31% free cement based on the total weight of solids. The resulting product may be used as a cement in a system not requiring high load bearing characteristics.

It may also be enriched by the addition of more cement to produce higher quality product.

I claim:

1. A method for reducing the sulfur dioxide emissions produced from the burning of fossil fuels which comprises directly injecting into a furnace boiler portland cement particles, in sufficient quantity so that the amount of portland cement present will be from about 2.8 to 5.6 times the amount of sulfur in the fuel being burned, based on the weight of the fuel, so that said cement particles react with said sulfur dioxide and remove said sulfur dioxide from the exhaust gas before the exhaust gas exits the boiler system.

2. A method as in claim 1, wherein the portland cement is injected into the system with the fossil fuel.

3. A method as in claim 1, wherein the portland cement is injected into the system with the combustion air.

4. A method as in claim 1, wherein the portland cement is injected into the combustion gases of the system.

5. A method as in claim 1, wherein the portland cement is type III portland cement.

* * * * *